United States Patent
Chen (10) Patent No.: US 12,223,845 B2
(45) Date of Patent: Feb. 11, 2025

(54) METHOD AND SYSTEM FOR UNMANNED AERIAL VEHICLE TO PASS THROUGH UNMANNED AERIAL VEHICLE AIRPORT

(71) Applicant: Jun Chen, Changsha (CN)

(72) Inventor: Jun Chen, Changsha (CN)

(*) Notice: Subject to any disclaimer, the term of this patent is extended or adjusted under 35 U.S.C. 154(b) by 263 days.

(21) Appl. No.: 17/875,579

(22) Filed: Jul. 28, 2022

(65) Prior Publication Data

US 2022/0371735 A1 Nov. 24, 2022

(30) Foreign Application Priority Data

Aug. 1, 2021 (CN) .......................... 202110877629.4

(51) Int. Cl.
*G08G 5/00* (2006.01)

(52) U.S. Cl.
CPC ............. *G08G 5/003* (2013.01); *G08G 5/006* (2013.01); *G08G 5/0069* (2013.01); *B64U 2201/10* (2023.01)

(58) Field of Classification Search
None
See application file for complete search history.

(56) References Cited

U.S. PATENT DOCUMENTS

| | | | | |
|---|---|---|---|---|
| 9,725,169 B2* | 8/2017 | Lemus Martin | ....... | B64U 50/30 |
| 11,493,940 B2* | 11/2022 | Ham | ................... | G08G 5/0086 |
| 2004/0243513 A1* | 12/2004 | Phillips | .................. | G06Q 30/04 |
| | | | | 705/40 |
| 2007/0145184 A1* | 6/2007 | Baudry | ............... | G01C 23/005 |
| | | | | 244/76 R |
| 2010/0292943 A1* | 11/2010 | Minor | .................. | G01C 21/188 |
| | | | | 702/64 |
| 2019/0317530 A1* | 10/2019 | Yang | ..................... | G08G 5/0013 |
| 2020/0257312 A1* | 8/2020 | Suzuki | ..................... | G08G 1/22 |
| 2020/0320885 A1* | 10/2020 | Subramaniyan | ..... | G08G 5/0034 |
| 2020/0349852 A1* | 11/2020 | DiCosola | ............. | G08G 5/0069 |
| 2021/0089055 A1* | 3/2021 | Tran | ........................ | G06N 3/08 |
| 2022/0396373 A1* | 12/2022 | Wang | ..................... | B64U 80/70 |
| 2023/0035682 A1* | 2/2023 | Seo | ........................ | G08G 5/0069 |
| 2024/0133693 A1* | 4/2024 | Ali | ........................ | G06Q 10/047 |

* cited by examiner

*Primary Examiner* — Redhwan K Mawari
*Assistant Examiner* — Kai Wang
(74) *Attorney, Agent, or Firm* — Daniel M. Cohn; Howard M. Cohn (57) ABSTRACT

The present invention provides a method and system for an unmanned aerial vehicle (UAV) to pass through an UAV airport, and relates to the field of unmanned aerial vehicle airport technologies. The method for an UAV to pass through an UAV airport includes: obtaining status information of an UAV; sending a request for an UAV airport information set to an index server; receiving the UAV airport information set sent by the index server; obtaining, through weight value calculation based on the UAV airport information set, a connected UAV airport station set; calculating and determining a reachable optimal-weight-value sequentially connected path set; and determining a flight path based on a weight value combination condition. In the present invention, an UAV can implement convenient self-parking and charging on the premise that a weight value combination condition is satisfied, so that a long-distance flight demand can be satisfied.

5 Claims, 4 Drawing Sheets

METHOD AND SYSTEM FOR UNMANNED AERIAL VEHICLE TO PASS THROUGH UNMANNED AERIAL VEHICLE AIRPORT

TECHNICAL FIELD

The present invention relates to the field of unmanned aerial vehicle technologies, and in particular, to a method and system for an unmanned aerial vehicle to pass through an unmanned aerial vehicle airport.

BACKGROUND

In the conventional technology, unmanned aerial vehicles have short ranges, and most unmanned aerial vehicles cannot fly for a long period of time.

In an improved technology, an unmanned aerial vehicle charging platform is used to charge or change a battery for an unmanned aerial vehicle to extend a range. However, with the growing demand for long-distance flight of an unmanned aerial vehicle, the selection of an unmanned aerial vehicle charging platform has become an increasingly pressing issue.

SUMMARY

The inventor finds that as the commercial application of unmanned aerial vehicles develops rapidly, a method for an unmanned aerial vehicle to pass through an unmanned aerial vehicle airport is urgently required. In the method, an unmanned aerial vehicle can select an unmanned aerial vehicle airport based on a particular combination of conditions to fly to a destination in accordance with operator requirements.

To overcome the deficiency in the conventional technology that an unmanned aerial vehicle cannot select an unmanned aerial vehicle airport based on a particular combination of conditions to fly to a destination, the patent of the present invention provides a method and system for an unmanned aerial vehicle to pass through an unmanned aerial vehicle airport to resolve the problem in the BACKGROUND.

To achieve the foregoing objective, the present invention is implemented by using the following technical solution: A method for an unmanned aerial vehicle to pass through an unmanned aerial vehicle airport is provided, and the method includes:

obtaining status information of an unmanned aerial vehicle, where the status information includes a maximum cruising range M, start flight coordinates Pos1 of the unmanned aerial vehicle, and target flight coordinates Pos2 of the unmanned aerial vehicle;

sending a request for an unmanned aerial vehicle airport information set to an index server, where the request for the unmanned aerial vehicle airport information set includes obtaining an unmanned aerial vehicle airport information set in an interval between the start flight coordinates Pos1 of the unmanned aerial vehicle and the target flight coordinates Pos2 of the unmanned aerial vehicle for a specified period of time;

receiving the unmanned aerial vehicle airport information set sent by the index server, where the unmanned aerial vehicle airport information set includes a plurality of unmanned aerial vehicle airports, and each unmanned aerial vehicle airport includes coordinates of an access point of the unmanned aerial vehicle airport and an unmanned aerial vehicle airport server address;

obtaining, through weight value calculation based on the unmanned aerial vehicle airport information set, a connected unmanned aerial vehicle airport station set including a weight value of an inter-airport path including coordinates of access points of any two sequentially connected unmanned aerial vehicle airports, where the weight value calculation includes weight values all being 1, and an inter-airport distance between the connected unmanned aerial vehicle airports is less than M;

calculating an optimal-weight-value sequentially connected path set based on the connected unmanned aerial vehicle airport station set, where the optimal-weight-value sequentially connected path set includes a minimum-weight-value sequentially connected path set;

obtaining, from the unmanned aerial vehicle airport server addresses, a parking place reservation occupancy status of an unmanned aerial vehicle airport within sequentially estimated passage periods in the optimal-weight-value sequentially connected path set, excluding a path corresponding to an unmanned aerial vehicle airport in which the parking place reservation occupancy status of each of the parking places is not idle, and determining a reachable optimal-weight-value sequentially connected path set; and determining a flight path based on a weight value combination condition and the reachable optimal-weight-value sequentially connected path set.

Further, the method is applied to the unmanned aerial vehicle, and includes:

sending a request for an airport route information set to the index server, where the request for the airport route information set includes obtaining an airport route information set between unmanned aerial vehicle airports based on the flight path;

receiving the airport route information set sent by the index server, where the airport route information set includes an airport route, and the airport route includes longitude, latitude, and height information of an access point of an origin unmanned aerial vehicle airport, a mark point, and an access point of a destination unmanned aerial vehicle airport;

sequentially connecting the access point of the origin unmanned aerial vehicle airport, the mark point, and the access point of the destination unmanned aerial vehicle airport of the airport route of the flight path to obtain a flight route; and flying along the flight route and passing through or stopping at the unmanned aerial vehicle airport.

Further, the flying along the flight route and passing through or stopping at the unmanned aerial vehicle airport further includes: making a prepayment to an unmanned aerial vehicle airport server based on a blockchain payment address of the unmanned aerial vehicle airport server in the flight route, where the prepayment depends on estimated parking duration.

Further, the obtaining, through weight value calculation based on the unmanned aerial vehicle airport information set, a connected unmanned aerial vehicle airport station set including a weight value of an inter-airport path including coordinates of access points of any two sequentially connected unmanned aerial vehicle airports, where the weight value of the inter-airport path is obtained through weight value calculation further includes:

step 1: obtaining status information of an unmanned aerial vehicle, where the status information includes: a set average flight speed V; and obtaining an unmanned aerial vehicle airport information set from an index server, where the unmanned aerial vehicle airport information set includes average duration of takeoff duration and landing duration of each unmanned aerial vehicle airport;

step 2: taking access points of any two unmanned aerial vehicle airports from the unmanned aerial vehicle airport information set;

step 3: if a distance D between an access point of a first unmanned aerial vehicle airport and an access point of a second unmanned aerial vehicle airport is less than M, connecting the access point of the first unmanned aerial vehicle airport and the access point of the second unmanned aerial vehicle airport to obtain an inter-airport path;

step 4: calculating a weight value of the inter-airport path, where the weight value of the inter-airport path=D/the set average flight speed V+average duration of takeoff duration and landing duration of the first unmanned aerial vehicle airport+average duration of takeoff duration and landing duration of the second unmanned aerial vehicle airport+parking for charging duration of the second unmanned aerial vehicle airport; and step 5: repeating step 2 to step 4, until access points of all of the unmanned aerial vehicle airports in the unmanned aerial vehicle airport information set are connected, to obtain the connected unmanned aerial vehicle airport station set including the weight value of the inter-airport path including the coordinates of the access points of any two sequentially connected unmanned aerial vehicle airports.

Further, the obtaining, through weight value calculation based on the unmanned aerial vehicle airport information set, a connected unmanned aerial vehicle airport station set including a weight value of an inter-airport path including coordinates of access points of any two sequentially connected unmanned aerial vehicle airports, where the weight value of the inter-airport path is obtained through weight value calculation further includes:

step 6: obtaining an unmanned aerial vehicle airport information set from an index server, where the unmanned aerial vehicle airport information set includes a parking unit price of an access point of each unmanned aerial vehicle airport;

step 7: taking access points of any two unmanned aerial vehicle airports from the unmanned aerial vehicle airport information set;

step 8: if a distance D between an access point of a first unmanned aerial vehicle airport and an access point of a second unmanned aerial vehicle airport is less than M, connecting the access point of the first unmanned aerial vehicle airport and the access point of the second unmanned aerial vehicle airport to obtain an inter-airport path;

step 9: calculating a weight value of the inter-airport path, where the weight value of the inter-airport path=D*flight mileage unit price+a parking unit price of the access point of the second unmanned aerial vehicle airport; and step 10: repeating step 7 to step 9, until access points of all of the unmanned aerial vehicle airports in the unmanned aerial vehicle airport information set are connected, to obtain the connected unmanned aerial vehicle airport station set including the weight value of the inter-airport path including the coordinates of the access points of any two sequentially connected unmanned aerial vehicle airports.

According to another aspect, a method for an unmanned aerial vehicle to pass through an unmanned aerial vehicle airport is provided, where the method is applied to an index server, and includes:

receiving a request for an unmanned aerial vehicle airport information set from an unmanned aerial vehicle, where the request for the unmanned aerial vehicle airport information set includes the following instruction: obtaining an unmanned aerial vehicle airport information set in an interval between start flight coordinates Pos1 of the unmanned aerial vehicle and target flight coordinates Pos2 of the unmanned aerial vehicle for a specified period of time;

determining the unmanned aerial vehicle airport information set in the interval between the start flight coordinates Pos1 of the unmanned aerial vehicle and the target flight coordinates Pos2 of the unmanned aerial vehicle within the specified period, where the unmanned aerial vehicle airport information set includes a plurality of unmanned aerial vehicle airports, and each unmanned aerial vehicle airport includes coordinates of an access point of the unmanned aerial vehicle airport and an unmanned aerial vehicle airport server address;

obtaining, from the unmanned aerial vehicle airport server addresses, a parking place reservation occupancy status of an unmanned aerial vehicle airport within the specified period in the unmanned aerial vehicle airport information set, excluding a path corresponding to an unmanned aerial vehicle airport in which the parking place reservation occupancy status of each of the parking places is not idle, and determining a reachable unmanned aerial vehicle airport information set; and sending the reachable unmanned aerial vehicle airport information set to the unmanned aerial vehicle.

Further, the method includes:

receiving a request for an airport route information set of the unmanned aerial vehicle from the unmanned aerial vehicle, where the request for the airport route information set includes determining an airport route information set between unmanned aerial vehicle airports based on a flight path sent by the unmanned aerial vehicle, and the airport route information includes longitude, latitude, and height information of an access point of an origin unmanned aerial vehicle airport, a mark point, and an access point of a destination unmanned aerial vehicle airport; and sending the airport route information set to the unmanned aerial vehicle.

According to another aspect, an unmanned aerial vehicle is provided, and includes a flight path unit, a flight route airport route unit, and an unmanned aerial vehicle main unit, where:

the flight path unit is configured to generate a flight path from start flight coordinates Pos1 of an unmanned aerial vehicle to target flight coordinates Pos2 of the unmanned aerial vehicle, so that the unmanned aerial vehicle determines a flight route and controls flight of the unmanned aerial vehicle;

the flight route airport route unit is configured to generate an actual flight route from the start flight coordinates Pos1 of the unmanned aerial vehicle to the target flight coordinates Pos2 of the unmanned aerial vehicle to control flight of the unmanned aerial vehicle; and the unmanned aerial vehicle main unit includes a processor module, a communication module, a storage module, a flight module, and a power supply module, and is configured to: execute instructions of the flight path unit and the flight route airport route unit to control flight of the unmanned aerial vehicle, and communicate with an index server and an unmanned aerial vehicle airport server through the communication module.

According to another aspect, a server is provided, and includes an unmanned aerial vehicle airport information set unit, an airport route unit, and a server main unit, where:

the unmanned aerial vehicle airport information set unit is configured to determine an unmanned aerial vehicle airport information set in an interval between start flight coordinates Pos1 of an unmanned aerial vehicle and target flight coordinates Pos2 of the unmanned aerial vehicle for a specified period of time;

the airport route unit is configured to manage an airport route between unmanned aerial vehicle airports; and the server main unit includes a processor module, a communication module, a storage module, and a power supply module, and is configured to: execute an instruction of a takeoff and landing route unit, and communicate with the unmanned aerial vehicle through the communication module.

According to another aspect, a non-transitory computer-readable storage medium is provided, and stores a computer program, where when being executed by a processor, the computer program implements the steps in the foregoing method for an unmanned aerial vehicle to pass through an unmanned aerial vehicle airport.

The present invention provides a method and system for an unmanned aerial vehicle to pass through an unmanned aerial vehicle airport, which have the following beneficial effects:

In the present invention, obtains an unmanned aerial vehicle airport information set between the starting position and the destination from the index server, performs selection based on a range of an unmanned aerial vehicle, assigns weight values, finds an optimal-weight-value sequentially connected path set, and further determines a flight path based on a weight value combination condition. In the present invention, an unmanned aerial vehicle can implement convenient self-parking and charging on the premise that a combination condition is satisfied, so that a long-distance flight demand can be satisfied.

DETAILED DESCRIPTION

The present invention is further described below with reference to the accompanying drawings and embodiments.

Embodiment One

Figure 1:
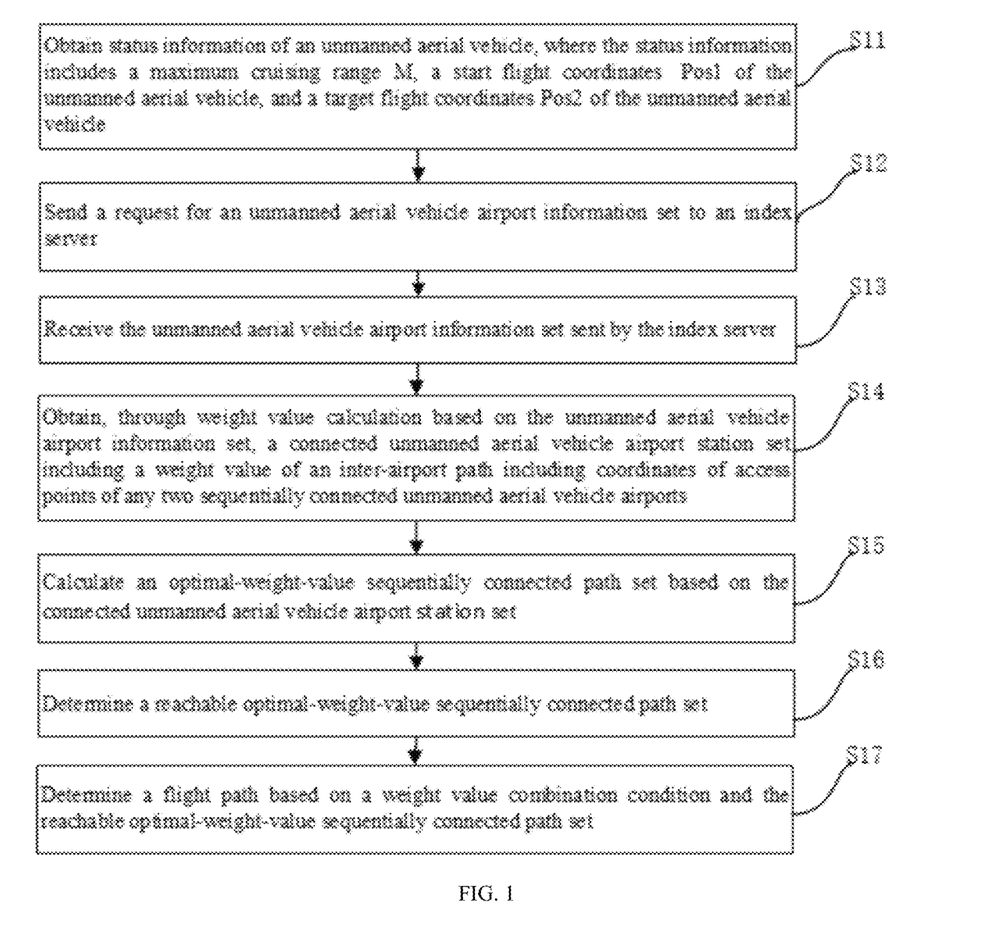
FIG. 1 is a flowchart of Embodiment 1 according to the present invention.

Embodiment one of the present invention discloses a method for an unmanned aerial vehicle to pass through an unmanned aerial vehicle airport. Refer to FIG. 1. The method includes the following steps.

Step S11: Obtain status information of an unmanned aerial vehicle, where the status information includes a maximum cruising range M, start flight coordinates Pos1 of the unmanned aerial vehicle, and target flight coordinates Pos2 of the unmanned aerial vehicle.

Step S12: Send a request for an unmanned aerial vehicle airport information set to an index server, where the request for the unmanned aerial vehicle airport information set includes obtaining an unmanned aerial vehicle airport information set in an interval between the start flight coordinates Pos1 of the unmanned aerial vehicle and the target flight coordinates Pos2 of the unmanned aerial vehicle for a specified period of time.

Step S13: Receive the unmanned aerial vehicle airport information set sent by the index server, where the unmanned aerial vehicle airport information set includes a plurality of unmanned aerial vehicle airports, and each unmanned aerial vehicle airport includes coordinates of an access point of the unmanned aerial vehicle airport and an unmanned aerial vehicle airport server address.

Step S14: Obtain, through weight value calculation based on the unmanned aerial vehicle airport information set, a connected unmanned aerial vehicle airport station set including a weight value of an inter-airport path including coordinates of access points of any two sequentially connected unmanned aerial vehicle airports, where the weight value calculation includes weight values all being 1, and an inter-airport distance between the connected unmanned aerial vehicle airports is less than M.

Step S15: Calculate an optimal-weight-value sequentially connected path set based on the connected unmanned aerial vehicle airport station set, where the optimal-weight-value sequentially connected path set includes a minimum-weight-value sequentially connected path set.

Algorithms for calculating a shortest path include a Dijkstra algorithm, a Bellman-Ford algorithm, a Floyd algorithm, an SPFA algorithm, and the like.

Step S16: Obtain, from the unmanned aerial vehicle airport server addresses, a parking place reservation occupancy status of an unmanned aerial vehicle airport within sequentially estimated passage periods in the optimal-weight-value sequentially connected path set, exclude a path corresponding to an unmanned aerial vehicle airport in which the parking place reservation occupancy status of each of the parking places is not idle, and determine a reachable optimal-weight-value sequentially connected path set.

Step S17: Determine a flight path based on a weight value combination condition and the reachable optimal-weight-value sequentially connected path set. During actual flight, a user may perform division and combination based on various conditions to obtain a flight path with an optimal travel route or may determine a flight path that satisfies all requirements such as passing through a minimum quantity of unmanned aerial vehicle airports, duration being minimized, and costs being the lowest.

Through the foregoing steps, a long-distance target flight can be implemented while the minimum quantity of airports and a combination condition thereof are satisfied, making it more convenient for an unmanned aerial vehicle to fly a long distance.

The foregoing embodiment may be implemented on an unmanned aerial vehicle, may be run on an index server or an unmanned aerial vehicle airport server, or may be run on a third-party Web server, a blockchain node, or the like.

Further, the method is applied to the unmanned aerial vehicle, and includes:

sending a request for an airport route information set to the index server, where the request for the airport route information set includes obtaining an airport route information set between unmanned aerial vehicle airports based on the flight path;

receiving the airport route information set sent by the index server, where the airport route information set includes an airport route, and the airport route includes longitude, latitude, and height information of an access point of an origin unmanned aerial vehicle airport, a mark point, and an access point of a destination unmanned aerial vehicle airport;

sequentially connecting the access point of the origin unmanned aerial vehicle airport, the mark point, and the access point of the destination unmanned aerial vehicle airport of the airport route of the flight path to obtain a flight route, where the unmanned aerial vehicle may use different flight strategies such as straight flight, curved flight, and parabolic flight between different mark points; and flying along the flight route and passing through or stopping at the unmanned aerial vehicle airport.

With the arrangement of unmanned aerial vehicle airports, airway routes between the unmanned aerial vehicle airports may be conventional routes that have been tested, and the index server manages query of airport route information between the unmanned aerial vehicle airports, to facilitate airspace regulation and guaranteeing airspace traffic safety. In addition, because unmanned aerial vehicle airports actively maintain normal operation of airport routes, a lot of troubles have been avoided for the flight of unmanned aerial vehicles, and this lays a foundation for the large-scale commercial application of unmanned aerial vehicles.

Further, the flying along the flight route and passing through or stopping at the unmanned aerial vehicle airport further includes: making a prepayment to an unmanned aerial vehicle airport server based on a blockchain payment address of the unmanned aerial vehicle airport server in the flight route, where the prepayment depends on estimated parking duration.

In many scenarios, for example, when services in an unmanned aerial vehicle airport are very busy, parking for charging may be implemented after a prepayment is made. The direct payment using a blockchain may include a manner such as a fiat digital currency or may include another non-currency manner, so that transaction traceability is implemented, flight disputes are reduced, and flight convenience is improved.

Further, the obtaining, through weight value calculation based on the unmanned aerial vehicle airport information set, a connected unmanned aerial vehicle airport station set including a weight value of an inter-airport path including coordinates of access points of any two sequentially connected unmanned aerial vehicle airports, where the weight value of the inter-airport path is obtained through weight value calculation further includes:

step 1: obtaining status information of an unmanned aerial vehicle, where the status information includes: a set average flight speed V; and obtaining an unmanned aerial vehicle airport information set from an index server, where the unmanned aerial vehicle airport information set includes average duration of takeoff duration and landing duration of each unmanned aerial vehicle airport;

step 2: taking access points of any two unmanned aerial vehicle airports from the unmanned aerial vehicle airport information set;

step 3: if a distance D between an access point of a first unmanned aerial vehicle airport and an access point of a second unmanned aerial vehicle airport is less than M, connecting the access point of the first unmanned aerial vehicle airport and the access point of the second unmanned aerial vehicle airport to obtain an inter-airport path;

step 4: calculating a weight value of the inter-airport path, where the weight value of the inter-airport path=D/the set average flight speed V+average duration of takeoff duration and landing duration of the first unmanned aerial vehicle airport+average duration of takeoff duration and landing duration of the second unmanned aerial vehicle airport+parking for charging duration of the second unmanned aerial vehicle airport; and step 5: repeating step 2 to step 4, until access points of all of the unmanned aerial vehicle airports in the unmanned aerial vehicle airport information set are connected, to obtain the connected unmanned aerial vehicle airport station set including the weight value of the inter-airport path including the coordinates of the access points of any two sequentially connected unmanned aerial vehicle airports.

Through step 1 to step 5, a long-distance target flight can be implemented while shortest flight duration and a combination condition thereof are satisfied, making it more convenient for an unmanned aerial vehicle to fly a long distance.

Further, the obtaining, through weight value calculation based on the unmanned aerial vehicle airport information set, a connected unmanned aerial vehicle airport station set including a weight value of an inter-airport path including the coordinates of the access points of any two sequentially connected unmanned aerial vehicle airports, where the weight value of the inter-airport path is obtained through weight value calculation further includes:

step 6: obtaining an unmanned aerial vehicle airport information set from an index server, where the unmanned aerial vehicle airport information set includes a parking unit price of an access point of each unmanned aerial vehicle airport;

step 7: taking access points of any two unmanned aerial vehicle airport from the unmanned aerial vehicle airport information set;

step 8: if a distance D between an access point of a first unmanned aerial vehicle airport and an access point of a second unmanned aerial vehicle airport is less than M, connecting the access point of the first unmanned aerial vehicle airport and the access point of the second unmanned aerial vehicle airport to obtain an inter-airport path;

step 9: calculating a weight value of the inter-airport path, where the weight value of the inter-airport path=D*a flight mileage unit price+a parking unit price of the access point of the second unmanned aerial vehicle airport; and step 10: repeating step 7 to step 9, until access points of all of the unmanned aerial vehicle airports in the unmanned aerial vehicle airport information set are connected, to obtain the connected unmanned aerial vehicle airport station set including the weight value of the inter-airport path including the coordinates of the access points of any two sequentially connected unmanned aerial vehicle airports.

Through step 6 to step 10, a long-distance target flight can be implemented while a minimum flight expense and a combination condition thereof are satisfied, making it more convenient for an unmanned aerial vehicle to fly a long distance.

During actual operation, a distance between unmanned aerial vehicle airports may be used as a weight value to further enrich combination determination conditions.

Embodiment Two

Embodiment two of the present invention discloses a method for an unmanned aerial vehicle to pass through an unmanned aerial vehicle airport, where the method is applied to an index server, and includes:
receiving a request for an unmanned aerial vehicle airport information set from an unmanned aerial vehicle, where the request for the unmanned aerial vehicle airport information set includes the following instruction: obtaining an unmanned aerial vehicle airport information set in an interval between start flight coordinates Pos1 of the unmanned aerial vehicle and target flight coordinates Pos2 of the unmanned aerial vehicle for a specified period of time; and
determining the unmanned aerial vehicle airport information set in the interval between the start flight coordinates Pos1 of the unmanned aerial vehicle and the target flight coordinates Pos2 of the unmanned aerial vehicle within the specified period, where the unmanned aerial vehicle airport information set includes a plurality of unmanned aerial vehicle airports, and each unmanned aerial vehicle airport includes coordinates of an access point of the unmanned aerial vehicle airport and an unmanned aerial vehicle airport server address.

Figure 5:
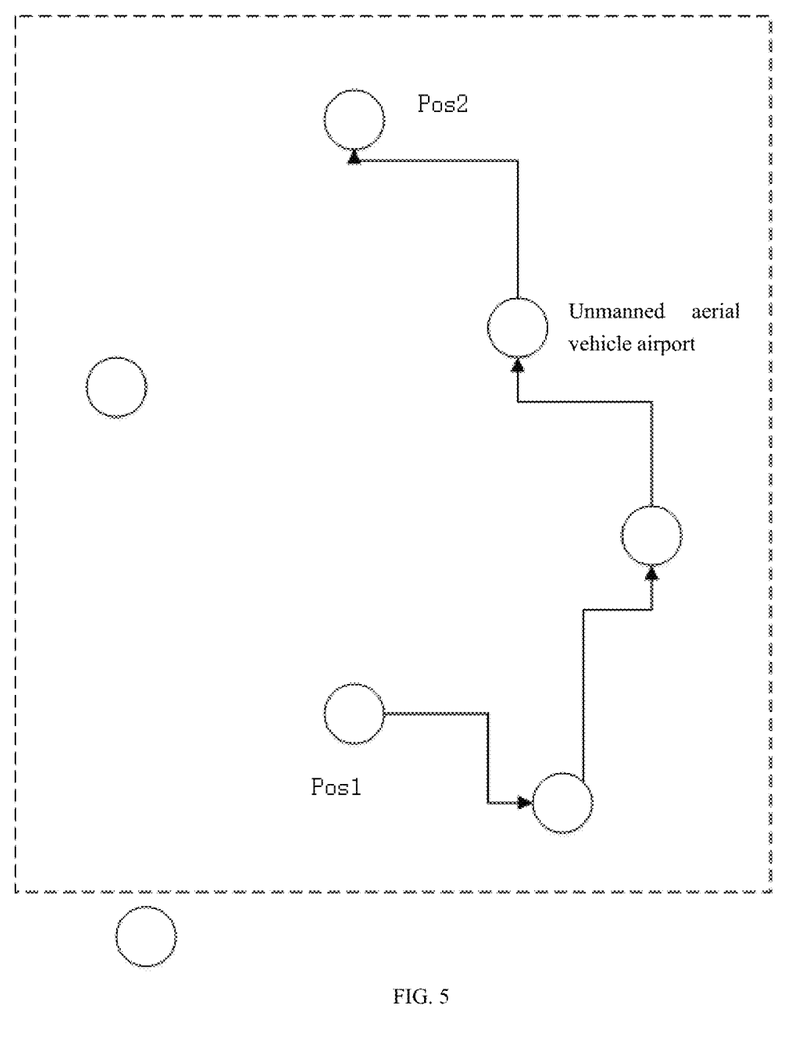
FIG. 5 is a schematic diagram of determining an unmanned aerial vehicle airport information set according to an embodiment of the present invention.

Refer to FIG. 5, in an implementation, a distance DP=the start position Pos1—the destination position Pos2, and a side length L=e*DP, where e is a range coefficient.

One square may be drawn by using a connecting line between Pos1 and Pos2 as an axis and L as the side length, the square symmetrically includes Pos1 and Pos2, and all unmanned aerial vehicle airports whose coordinates of access points are inside the square are determined as the unmanned aerial vehicle airport information set.

The method further includes: obtaining, from the unmanned aerial vehicle airport server addresses, a parking place reservation occupancy status of an unmanned aerial vehicle airport within the specified period in the unmanned aerial vehicle airport information set, excluding a path corresponding to an unmanned aerial vehicle airport in which the parking place reservation occupancy status of each of the parking places is not idle, and determining a reachable unmanned aerial vehicle airport information set; and
sending the reachable unmanned aerial vehicle airport information set to the unmanned aerial vehicle.

Further, the method includes:
receiving a request for an airport route information set of the unmanned aerial vehicle from the unmanned aerial vehicle, where the request for the airport route information set includes determining an airport route information set between unmanned aerial vehicle airports based on a flight path sent by the unmanned aerial vehicle, and the airport route information includes longitude, latitude, and height information of an access point of an origin unmanned aerial vehicle airport, a mark point, and an access point of a destination unmanned aerial vehicle airport; and
sending the airport route information set to the unmanned aerial vehicle.

With the arrangement of unmanned aerial vehicle airports, airway routes between the unmanned aerial vehicle airports may be conventional routes that have been tested, and the index server manages query of airport route information between the unmanned aerial vehicle airports, to facilitate airspace regulation and guaranteeing airspace traffic safety. In addition, because unmanned aerial vehicle airports actively maintain normal operation of airport routes, a lot of troubles have been avoided for the flight of unmanned aerial vehicles, and this lays a foundation for the large-scale commercial application of unmanned aerial vehicles.

Embodiment Three

Figure 2:
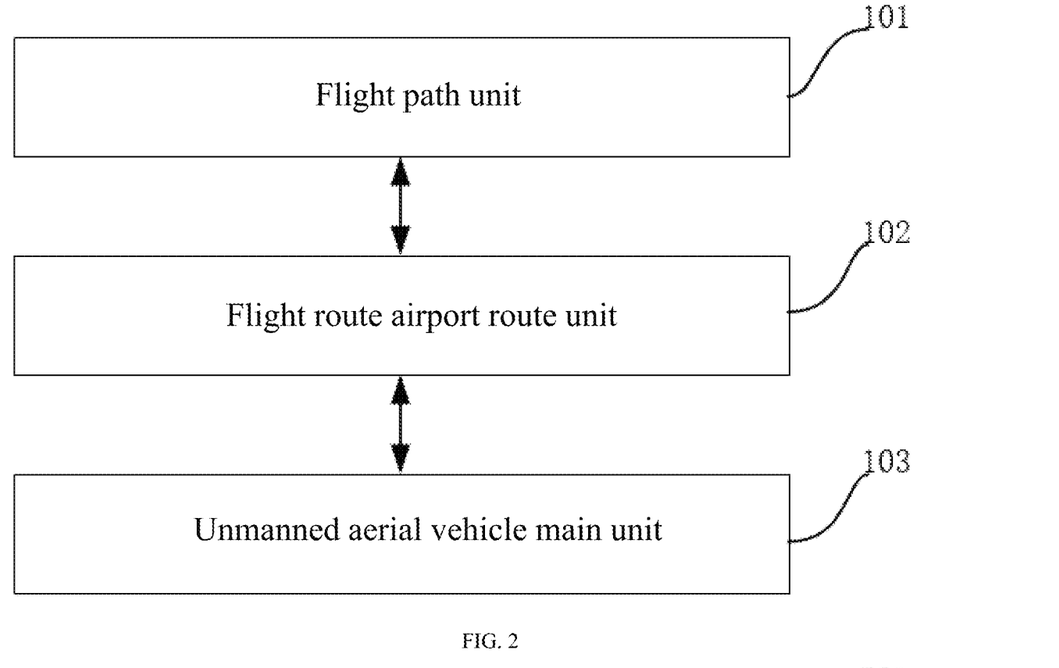
FIG. 2 is a schematic structural diagram of Embodiment 3 according to the present invention.

Embodiment three of the present invention discloses an unmanned aerial vehicle. Refer to FIG. 2. The unmanned aerial vehicle includes a flight path unit 201, a flight route airport route unit 202, and an unmanned aerial vehicle main unit 203.

The flight path unit 201 is configured to generate a flight path from start flight coordinates Pos1 of an unmanned aerial vehicle to target flight coordinates Pos2 of the unmanned aerial vehicle, so that the unmanned aerial vehicle determines a flight route and controls flight of the unmanned aerial vehicle.

The flight route airport route unit 202 is configured to generate an actual flight route from the start flight coordinates Pos1 of the unmanned aerial vehicle and the target flight coordinates Pos2 of the unmanned aerial vehicle to control flight of the unmanned aerial vehicle.

The unmanned aerial vehicle main unit 203 includes a processor module, a communication module, a storage module, a flight module, and a power supply module, and is configured to: execute instructions of the flight path unit and the flight route airport route unit to control flight of the unmanned aerial vehicle, and communicate with an index server and an unmanned aerial vehicle airport server through the communication module.

Embodiment Four

Figure 3:
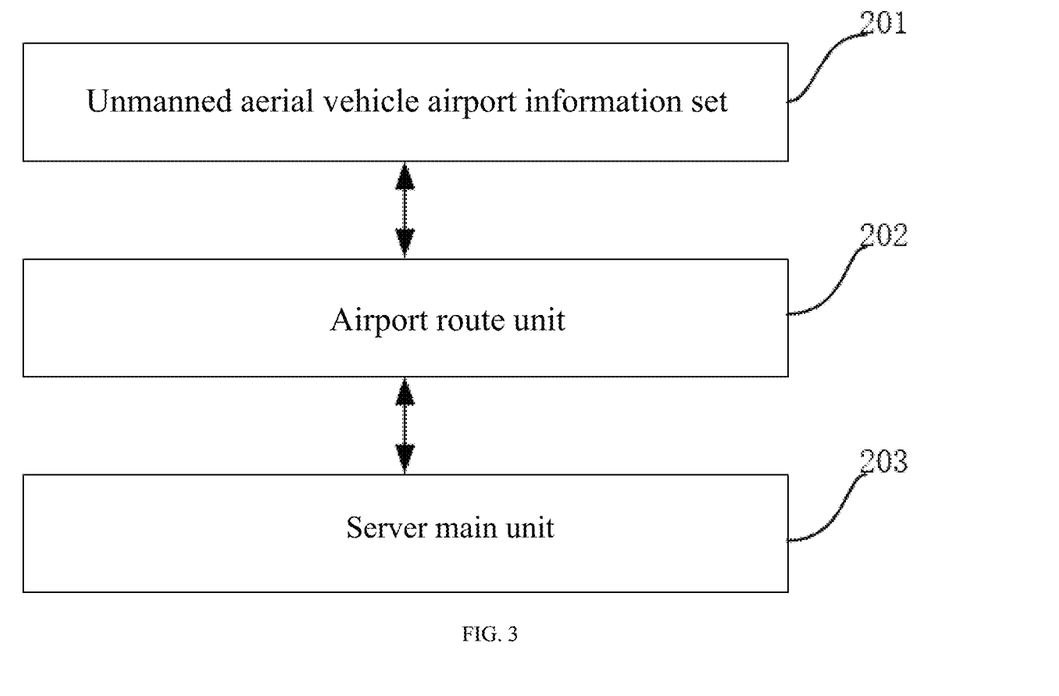
FIG. 3 is a schematic structural diagram of Embodiment 4 according to the present invention.

Embodiment four of the present invention discloses a server. Refer to FIG. 3. The server includes an unmanned aerial vehicle airport information set unit 201, an airport route unit 202, and a server main unit 203.

The unmanned aerial vehicle airport information set unit 201 is configured to determine an unmanned aerial vehicle airport information set in an interval between start flight coordinates Pos1 of an unmanned aerial vehicle and target flight coordinates Pos2 of the unmanned aerial vehicle for a specified period of time.

The airport route unit 202 is configured to manage an airport route between unmanned aerial vehicle airports.

The server main unit 203 includes a processor module, a communication module, a storage module, and a power supply module, and is configured to: execute an instruction of a takeoff and landing route unit, and communicate with the unmanned aerial vehicle through the communication module.

Figure 4:
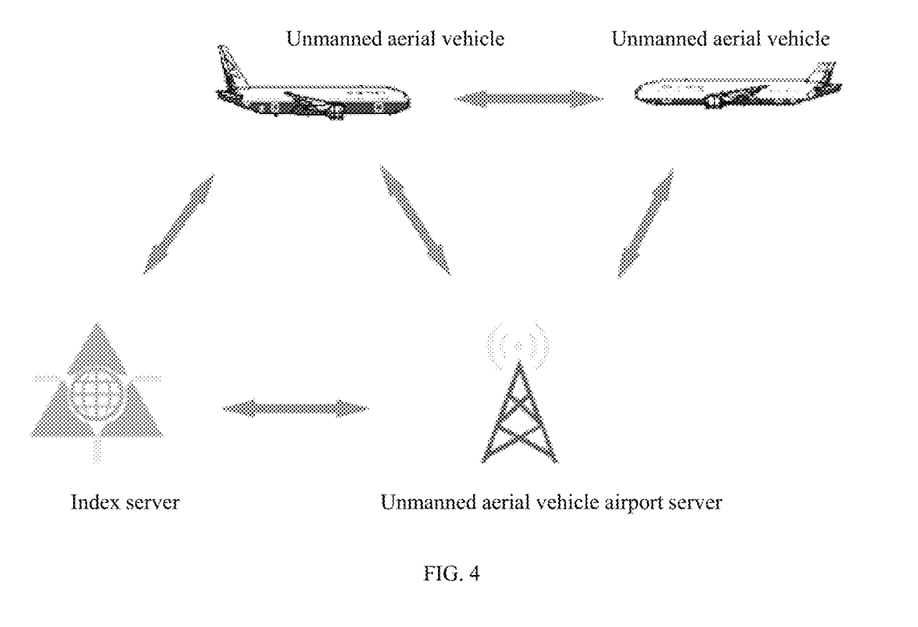
FIG. 4 is a block diagram of a system according to an embodiment of the present invention.

According to another aspect, a system for an unmanned aerial vehicle to pass through an unmanned aerial vehicle airport includes an unmanned aerial vehicle, an index server, and an unmanned aerial vehicle airport server. Refer to FIG.

4. Network connections are established between any two of the unmanned aerial vehicle, the index server, the unmanned aerial vehicle airport server, and the like. The index server and the unmanned aerial vehicle airport server may be arranged together.

Embodiment 5

Embodiment 5 of the present invention discloses a non-transitory computer-readable storage medium, storing a computer program, where when being executed by a processor, the computer program implements the steps in the method in the foregoing embodiment. The storage medium may include a high-speed random access storage medium, or may include a non-volatile storage medium such as a hard disk, a memory, a plug-in hard disk, a smart media card (Smart Media Card, SMC), a secure digital (Secure Digital, SD) card, a flash card (Flash Card), at least one disk storage medium device, a flash memory device, or anther volatile solid-state storage medium device.

In the present invention, obtains an unmanned aerial vehicle airport information set between the starting position and the destination from the index server, performs selection based on a range of an unmanned aerial vehicle, assigns weight values, finds an optimal-weight-value sequentially connected path set, and further determines a flight path based on a weight value combination condition. In the present invention, an unmanned aerial vehicle can implement convenient self-parking and charging on the premise that a combination condition is satisfied, so that a long-distance flight demand can be satisfied.

It may be clearly understood by a person skilled in the art that, for the purpose of convenient and brief description, for the units described above, the division of the foregoing functional modules is only an example for description. During actual application, the foregoing functions may be allocated to different functional modules as required. That is, the internal structure of the apparatus is divided into different functional modules, to complete all or some functions described above. For the foregoing system, apparatus, and unit, refer to a corresponding process in the foregoing method embodiments, and details are not described herein again.

In the several embodiments provided in the present application, it should be understood that the disclosed system, apparatus, and method may be implemented in other forms. For example, the described apparatus embodiment is merely an example. For example, the module or unit division is merely logical function division and may be other division in actual implementation. For example, a plurality of units or components may be combined or integrated into another system, or some features may be ignored or not performed. In addition, the shown or discussed mutual couplings or direct couplings or communication connections between the components may be implemented through some interfaces, and indirect couplings or communication connections between the apparatuses or units may be in an electrical form, a mechanical form, or another form.

The units described as separate parts may or may not be physically separate, and parts shown as units may or may not be physical units, that is, may be located in one position, or may be distributed on a plurality of network units. Some or all of the units may be selected according to actual needs to achieve the objects of the solutions in the embodiments.

In addition, functional units in the embodiments of the present invention may be integrated into one processing unit, or each of the units may exist alone physically, or two or more units are integrated into one unit. The integrated unit may be implemented in the form of hardware or a software functional unit.

When the integrated units are implemented in the form of a software functional unit and sold or used as an independent product, the integrated unit may be stored in a computer-readable storage medium. Based on such an understanding, the technical solutions in the present invention essentially, or the part contributing to the conventional technology, or all or some of the technical solutions may be implemented in the form of a software product. The computer software product is stored in a storage medium and includes several instructions for instructing a computer device (which may be a personal computer, a server, a network device or the like) or a processor (processor) to perform all or some of the steps of the method described in the embodiments of the present invention. The foregoing storage medium includes various media that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementations of the present invention, but are not intended to limit the protection scope of the present invention. Any variation or replacement that may be readily figured out by a person skilled in the art within the technical scope disclosed in the present invention shall fall within the protection scope of the present invention. Therefore, the protection scope of the present invention shall be subject to the protection scope of the claims.

The invention claimed is:

1. A method for an unmanned aerial vehicle to pass through an unmanned aerial vehicle airport, wherein the method comprises:

obtaining status information of an unmanned aerial vehicle, wherein the status information comprises a set average flight speed V, a maximum cruising range M, start flight coordinates Pos1 of the unmanned aerial vehicle, and target flight coordinates Pos2 of the unmanned aerial vehicle;

sending a request for an unmanned aerial vehicle airport information set to an index server, which index server comprises information of all unmanned aerial vehicle airports, wherein the request for the unmanned aerial vehicle airport information set comprises obtaining an unmanned aerial vehicle airport information set in an interval between the start flight coordinates Pos1 of the unmanned aerial vehicle and the target flight coordinates Pos2 of the unmanned aerial vehicle for a specified period of time;

receiving the unmanned aerial vehicle airport information set sent by the index server, wherein the unmanned aerial vehicle airport information set comprises a plurality of unmanned aerial vehicle airports, and each unmanned aerial vehicle airport comprises coordinates of an access point of the unmanned aerial vehicle airport, an average duration of takeoff duration and landing duration of each unmanned aerial vehicle airport, and an unmanned aerial vehicle airport server address;

obtaining, through weight value calculation based on the unmanned aerial vehicle airport information set, a connected unmanned aerial vehicle airport station set comprising a weight value of an inter-airport path between coordinates of access points of any two sequentially connected unmanned aerial vehicle airports, wherein the weight value calculation comprises weight values all being 1, and an inter-airport distance between the connected unmanned aerial vehicle airports is less than the M;

wherein the weight value of an inter-airport path is obtained by: step 2, taking access points of any two unmanned aerial vehicle airports from the unmanned aerial vehicle airport information set; step 3, if a distance D between an access point of a first unmanned aerial vehicle airport and an access point of a second unmanned aerial vehicle airport is less than the M, connecting the access point of the first unmanned aerial vehicle airport and the access point of the second unmanned aerial vehicle airport to obtain an inter-airport path; step 4, calculating a weight value of the inter-airport path, wherein the weight value of the inter-airport path=D/the set average flight speed V+average duration of takeoff duration and landing duration of the first unmanned aerial vehicle airport+average duration of takeoff duration and landing duration of the second unmanned aerial vehicle airport+parking for charging duration of the second unmanned aerial vehicle airport; and step 5, repeating step 2 to step 4, until access points of all of the unmanned aerial vehicle airports in the unmanned aerial vehicle airport information set are connected, to obtain the connected unmanned aerial vehicle airport station set comprising the weight value of the inter-airport path between the coordinates of the access points of any two sequentially connected unmanned aerial vehicle airports;

calculating an optimal-weight-value sequentially connected path set based on the connected unmanned aerial vehicle airport station set, wherein the optimal-weight-value sequentially connected path set comprises a minimum-weight-value sequentially connected path set;

obtaining, from the unmanned aerial vehicle airport server addresses, a parking place reservation occupancy status of unmanned aerial vehicle airports, that is, the unmanned aerial vehicle airports are occupied or not in estimated passage periods when they are sequentially passed by the unmanned aerial vehicle according to the optimal-weight-value sequentially connected path set, excluding a path corresponding to an unmanned aerial vehicle airport in which the parking place reservation occupancy status of each of the parking places is not idle, and determining a reachable optimal-weight-value sequentially connected path set; and determining a flight path based on a weight value combination condition and the reachable optimal-weight-value sequentially connected path set.

2. The method for an unmanned aerial vehicle to pass through an unmanned aerial vehicle airport according to claim 1, wherein the method is applied to the unmanned aerial vehicle, and further comprises:

sending a request for an airport route information set to the index server, wherein the request for the airport route information set comprises obtaining an airport route information set between unmanned aerial vehicle airports based on the flight path;

receiving the airport route information set sent by the index server, wherein the airport route information set comprises an airport route, and the airport route comprises longitude, latitude, and height information of an access point of an origin unmanned aerial vehicle airport, a mark point, and an access point of a destination unmanned aerial vehicle airport;

sequentially connecting the access point of the origin unmanned aerial vehicle airport, the mark point, and the access point of the destination unmanned aerial vehicle airport of the airport route of the flight path to obtain a flight route; and flying along the flight route and passing through or stopping at the unmanned aerial vehicle airport.

3. The method for an unmanned aerial vehicle to pass through an unmanned aerial vehicle airport according to claim 2, wherein the flying along the flight route and passing through or stopping at the unmanned aerial vehicle airport further comprises: making a prepayment to an unmanned aerial vehicle airport server based on a blockchain payment address of the unmanned aerial vehicle airport server in the flight route, wherein the prepayment depends on estimated parking duration.

4. A method for an unmanned aerial vehicle to pass through an unmanned aerial vehicle airport, wherein the method comprises:

obtaining status information of an unmanned aerial vehicle, wherein the status information comprises a maximum cruising range M, start flight coordinates Pos1 of the unmanned aerial vehicle, and target flight coordinates Pos2 of the unmanned aerial vehicle;

sending a request for an unmanned aerial vehicle airport information set to an index server, which index server comprises information of all unmanned aerial vehicle airports, wherein the request for the unmanned aerial vehicle airport information set comprises obtaining an unmanned aerial vehicle airport information set in an interval between the start flight coordinates Pos1 of the unmanned aerial vehicle and the target flight coordinates Pos2 of the unmanned aerial vehicle for a specified period of time;

receiving the unmanned aerial vehicle airport information set sent by the index server, wherein the unmanned aerial vehicle airport information set comprises a plurality of unmanned aerial vehicle airports, and each unmanned aerial vehicle airport comprises coordinates of an access point of the unmanned aerial vehicle airport, a parking unit price of an access point of each unmanned aerial vehicle airport, and an unmanned aerial vehicle airport server address;

obtaining, through weight value calculation based on the unmanned aerial vehicle airport information set, a connected unmanned aerial vehicle airport station set comprising a weight value of an inter-airport path between coordinates of access points of any two sequentially connected unmanned aerial vehicle airports, wherein the weight value calculation comprises weight values all being 1, and an inter-airport distance between the connected unmanned aerial vehicle airports is less than the M;

wherein the weight value of an inter-airport path is obtained by: step 2: taking access points of any two unmanned aerial vehicle airports from the unmanned aerial vehicle airport information set; step 3: if a distance D between an access point of a first unmanned aerial vehicle airport and an access point of a second unmanned aerial vehicle airport is less than the M, connecting the access point of the first unmanned aerial vehicle airport and the access point of the second unmanned aerial vehicle airport to obtain an inter-airport path; step 4: calculating a weight value of the inter-airport path, wherein the weight value of the inter-airport path=D*a flight mileage unit price+a parking unit price of the access point of the second unmanned aerial vehicle airport; and step 5: repeating step 2 to step 4, until access points of all of the unmanned aerial vehicle airports in the unmanned aerial vehicle airport information set are connected, to obtain the connected unmanned aerial vehicle airport station set comprising the weight value of the inter-airport path between the coordinates of the access points of any two sequentially connected unmanned aerial vehicle airports;

calculating an optimal-weight-value sequentially connected path set based on the connected unmanned aerial vehicle airport station set, wherein the optimal-weight-value sequentially connected path set comprises a minimum-weight-value sequentially connected path set;

obtaining, from the unmanned aerial vehicle airport server addresses, a parking place reservation occupancy status of unmanned aerial vehicle airports, that is, the unmanned aerial vehicle airports are occupied or not in estimated passage periods when they are sequentially passed by the unmanned aerial vehicle according to the optimal-weight-value sequentially connected path set, excluding a path corresponding to an unmanned aerial vehicle airport in which the parking place reservation occupancy status of each of the parking places is not idle, and determining a reachable optimal-weight-value sequentially connected path set; and determining a flight path based on a weight value combination condition and the reachable optimal-weight-value sequentially connected path set.

5. A non-transitory computer-readable storage medium, storing a computer program, wherein when being executed by a processor, the computer program implements the steps in the method for an unmanned aerial vehicle to pass through an unmanned aerial vehicle airport according to claim 1.

* * * * *